United States Patent
Fernandez-Galindo et al.

(10) Patent No.: US 11,912,121 B2
(45) Date of Patent: Feb. 27, 2024

(54) MULTI-TIER TRACTION BATTERY ARRAY SUPPORT STRUCTURE

(71) Applicant: Ford Global Technologies, LLC, Dearborn, MI (US)

(72) Inventors: Francisco Fernandez-Galindo, Canton, MI (US); Nihar Kotak, Farmington Hills, MI (US); Daniel Paul Roberts, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 17/326,422

(22) Filed: May 21, 2021

(65) Prior Publication Data

US 2022/0371419 A1 Nov. 24, 2022

(51) Int. Cl.
| | |
|---|---|
| *H01M 50/536* | (2021.01) |
| *B60K 1/04* | (2019.01) |
| *H01M 50/249* | (2021.01) |
| *H01M 10/625* | (2014.01) |
| *B60L 50/64* | (2019.01) |
| *H01M 50/244* | (2021.01) |

(52) U.S. Cl.
CPC ............... *B60K 1/04* (2013.01); *B60L 50/64* (2019.02); *H01M 10/625* (2015.04); *H01M 50/244* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 10,044,012 B2 | 8/2018 | Sham | |
| 10,611,234 B1* | 4/2020 | Berels | H01M 10/656 |
| 10,703,187 B2 | 7/2020 | Cavus et al. | |
| 2014/0322582 A1* | 10/2014 | Ruter | H01M 50/20 |
| | | | 429/177 |
| 2015/0111074 A1* | 4/2015 | Boddakayala | H01M 50/262 |
| | | | 429/72 |
| 2016/0118701 A1* | 4/2016 | Subramanian | H01M 10/0481 |
| | | | 429/120 |
| 2018/0294450 A1* | 10/2018 | Haag | H01M 50/271 |
| 2020/0091571 A1* | 3/2020 | Burgers | H01M 50/289 |
| 2020/0153062 A1 | 5/2020 | Collins | |
| 2020/0251698 A1* | 8/2020 | Paramasivam | H01M 10/613 |

FOREIGN PATENT DOCUMENTS

| | | |
|---|---|---|
| CN | 108110165 | 6/2018 |
| CN | 207441791 | 6/2018 |

* cited by examiner

*Primary Examiner* — Milton I Cano
*Assistant Examiner* — Joshua P McClure
(74) *Attorney, Agent, or Firm* — David B. Kelley; Carlson, Gaskey & Olds, P.C.

(57) ABSTRACT

A traction battery assembly according to an exemplary aspect of the present disclosure includes a lower tier of battery arrays, an upper tier of battery arrays, and a support structure disposed between the lower tier and the upper tier. The lower tier is suspended from a downwardly facing side of the support structure. The upper tier is disposed atop an upwardly facing side of the support structure.

18 Claims, 4 Drawing Sheets

MULTI-TIER TRACTION BATTERY ARRAY SUPPORT STRUCTURE

TECHNICAL FIELD

This disclosure relates generally to a battery array support structure and, more particularly, to a support structure that supports more than one tier of battery arrays.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. The traction battery pack can include battery arrays arranged in tiers and held within an enclosure.

SUMMARY

A traction battery assembly according to an exemplary aspect of the present disclosure includes, among other things, a lower tier of battery arrays, an upper tier of battery arrays, and a support structure disposed between the lower tier and the upper tier. The lower tier is suspended from a downwardly facing side of the support structure. The upper tier is disposed atop an upwardly facing side of the support structure.

In another exemplary embodiment of the foregoing assembly, the lower tier is vertically beneath both the support structure and the upper tier.

In another example of any of the foregoing assemblies, the support structure is a thermal exchange plate that manages thermal energy of the battery arrays in the upper tier and the battery arrays in the lower tier.

In another embodiment of any of the foregoing assemblies, the lower tier hangs from the support structure.

In another exemplary embodiment of any of the foregoing assemblies, the lower tier is supported exclusively through the support structure.

Another exemplary embodiment of any of the foregoing assemblies includes mechanical fasteners that secure the lower tier of battery arrays directly to the support structure and mechanical fasteners that secure the upper tier of battery arrays directly to the support structure.

In another exemplary embodiment of any of the foregoing assemblies, terminals of the battery arrays in the lower tier face downward and terminals of the battery arrays in the upper tier face upwards.

Another exemplary embodiment of any of the foregoing assemblies includes an enclosure assembly that encloses the lower tier and the upper tier. The lower tier is spaced a distance from the enclosure assembly to provide an opening area between all portions of the lower tier and the enclosure assembly.

In another exemplary embodiment of any of the foregoing assemblies, the enclosure assembly includes a lower enclosure and an upper enclosure that are secured directly to the support structure when enclosing the upper tier and the lower tier.

In another exemplary embodiment of any of the foregoing assemblies, the support structure includes a thermal exchange plate. Upper tier support beams are secured to the thermal exchange plate, and lower tier support beams are secured to the thermal exchange plate.

In another exemplary embodiment of any of the foregoing assemblies, the upper tier support beam and the lower tier support beams extend longitudinally in a cross-vehicle direction.

A method of securing battery arrays of a traction battery pack according to another exemplary aspect of the present disclosures includes, among other things, securing a lower tier of battery arrays to a downwardly facing side of a support structure such that the lower tier is suspended from the support structure. The method further includes securing an upper tier of battery arrays to an upwardly facing side of the support structure.

In another example of the foregoing method, the lower tier of battery array hang from the support structure after the securing.

Another example of any of the foregoing assemblies includes enclosing the lower tier and the upper tier within an enclosure assembly without directly supporting the lower tier on the enclosure assembly.

In another example of any of the foregoing assemblies, the lower tier of battery arrays are spaced from the enclosure assembly to provide an open area between the lower tier of battery arrays and the enclosure assembly.

Another exemplary embodiment of any of the foregoing methods includes securing the enclosure assembly direct to a peripheral area of the support structure.

Another exemplary embodiment of any of the foregoing methods includes using the support structure as a thermal exchange plate to manage thermal energy within the lower tier of battery arrays and the upper tier of battery arrays.

Another exemplary embodiment of any of the foregoing methods includes, after the securing, the terminals of the battery arrays in the lower tier facing downward and the terminals of the battery arrays in the upper tier facing upward.

In another exemplary embodiment of any of the foregoing methods, the lower tier is vertically beneath both the support structure and the upper tier.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a support structure that can support more that one tier of battery arrays. In the exemplary embodiment, the support structure supports an upper tier and a lower tier of battery arrays. The upper tier can be secured to an upper side of the support structure. The lower tier can be mechanically secured to an underside of the support structure.

In an example, the support structure can be used as a thermal exchange plate to manage thermal energy levels in the battery arrays within the upper tier and the lower tier. In the past, different tiers of battery arrays have included their own support structure and/or cooling thermal exchange plate.

Figure 1:
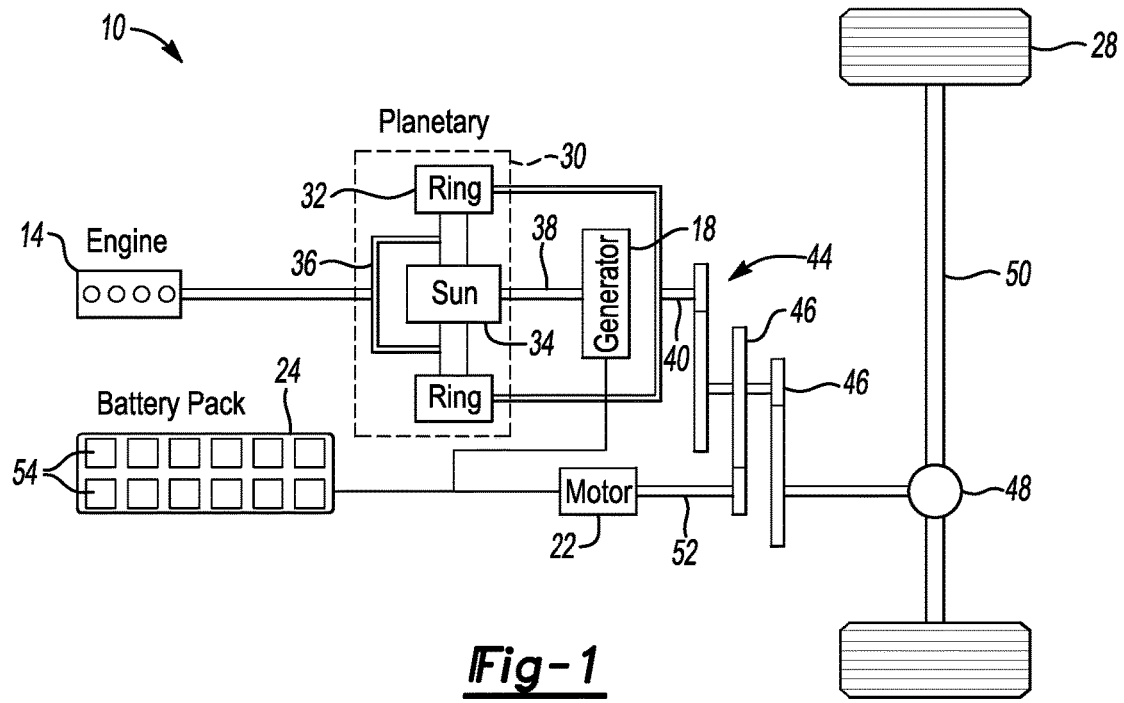
FIG. 1 illustrates a schematic view of a powertrain of an electrified vehicle.

FIG. 1 schematically illustrates a powertrain 10 for an electrified vehicle. Although depicted as a hybrid electric vehicle (HEV), it should be understood that the concepts described herein are not limited to HEVs and could extend to other electrified vehicles, including, but not limited to, plug-in hybrid electric vehicles (PHEVs), battery electric vehicles (BEVs), fuel cell vehicles, etc.

In an embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24.

In this example, the second drive system is considered an electric drive system of the powertrain 10. The first and second drive systems are each capable of generating torque to drive one or more sets of vehicle drive wheels 28 of the electrified vehicle. Although a power-split configuration is depicted in FIG. 1, the teachings of this disclosure can extend to any hybrid or electric vehicle including full hybrids, parallel hybrids, series hybrids, mild hybrids, or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is a high-voltage traction battery pack that includes a plurality of battery arrays 54 (i.e., battery assemblies or groupings of battery cells) capable of outputting electrical power to operate the motor 22, the generator 18, and/or other electrical loads of the electrified vehicle for providing power to propel the drive wheels 28. Other types of energy storage devices and/or output devices could also be used to electrically power the electrified vehicle.

Figure 2:
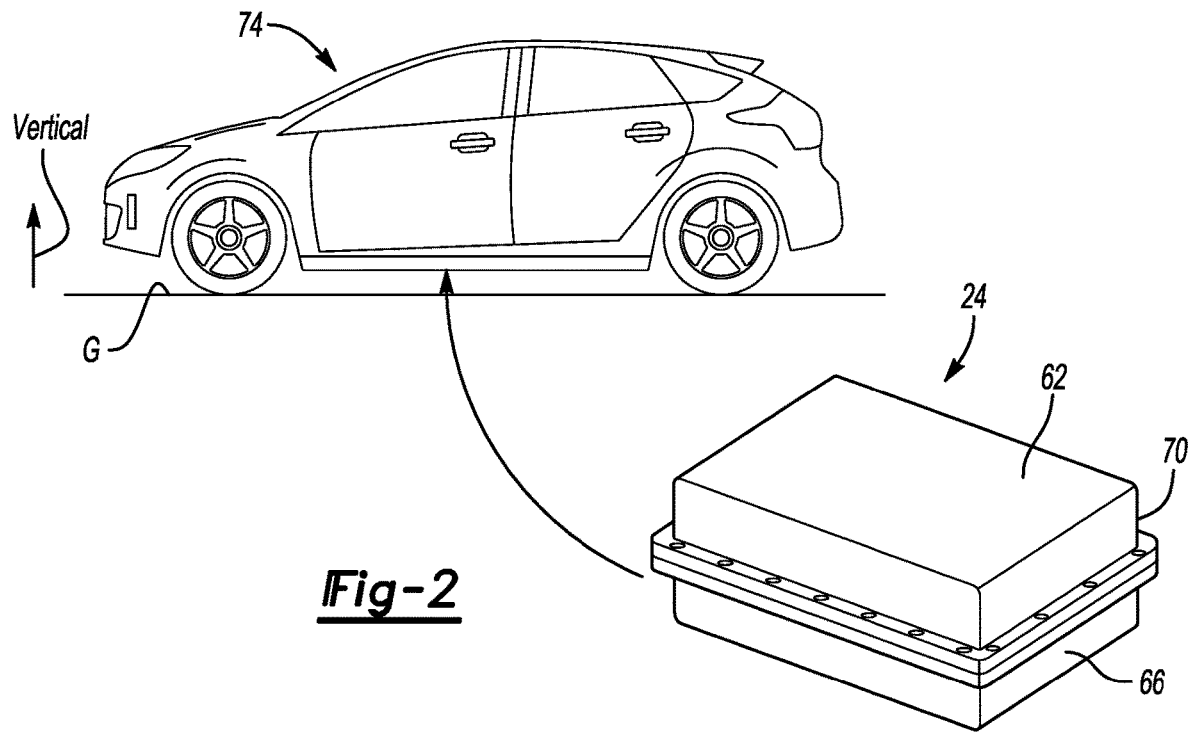
FIG. 2 illustrates an electrified vehicle having the powertrain of FIG. 1 and showing a perspective view of a battery pack from the powertrain.

Referring now to FIG. 2, the battery pack 24, in the exemplary embodiment, includes an enclosure assembly 62. In this example, the enclosure assembly 62 includes a lower portion 66 and an upper portion 70 that are joined to enclosure the battery arrays 54. The lower portion 66 is vertically beneath the upper portion 70 when the battery pack 24 is installed within a vehicle 74. Vertical, for purposes of this disclosure, is with reference to ground G and the general orientation of the vehicle 74 during operation.

In this example, the lower portion 66 is a tray that is metal or metal alloy. The lower portion 66 could be aluminum, for example. The upper portion 70 is considered a lid. The upper portion can be a polymer or polymer-based composite material. The upper portion 70 can be a glass reinforced polymer. The battery pack 24 is installed against an underbody of the vehicle 74 beneath a passenger compartment of the vehicle 74.

Figure 3:
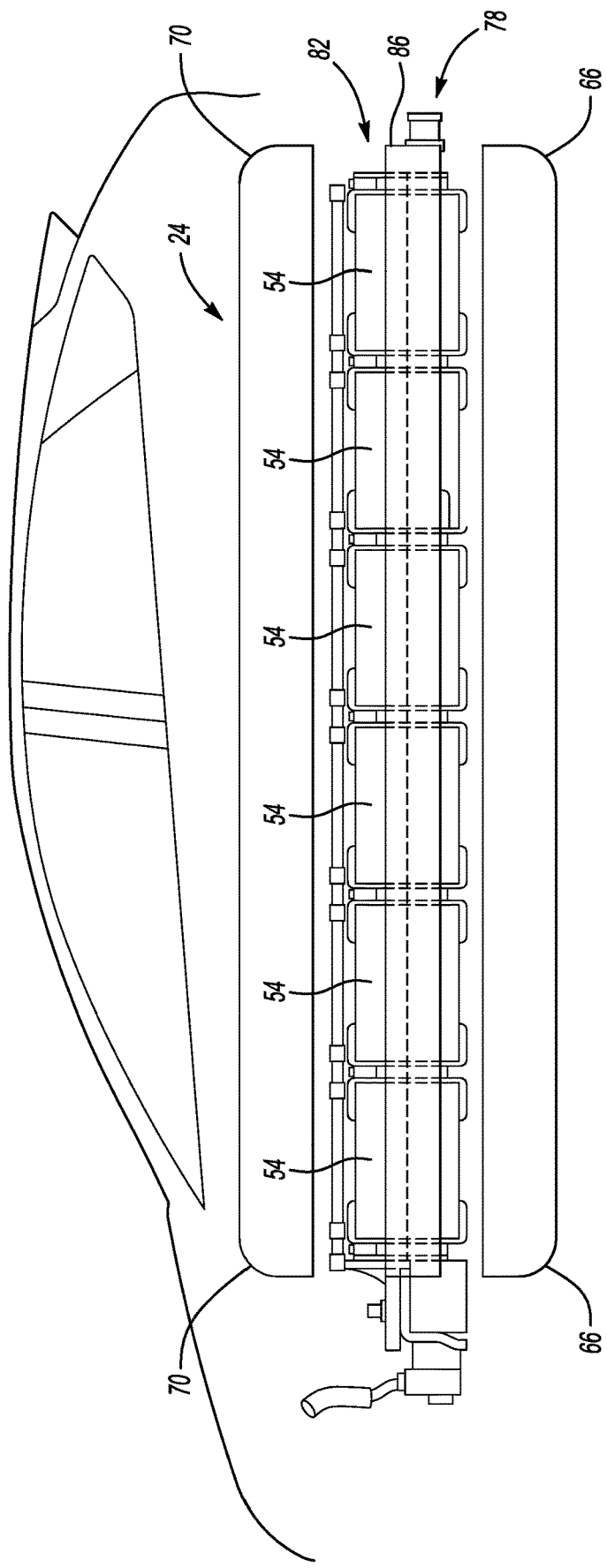
FIG. 3 illustrates an expanded view of the battery pack shown in FIG. 2.
Figure 4:
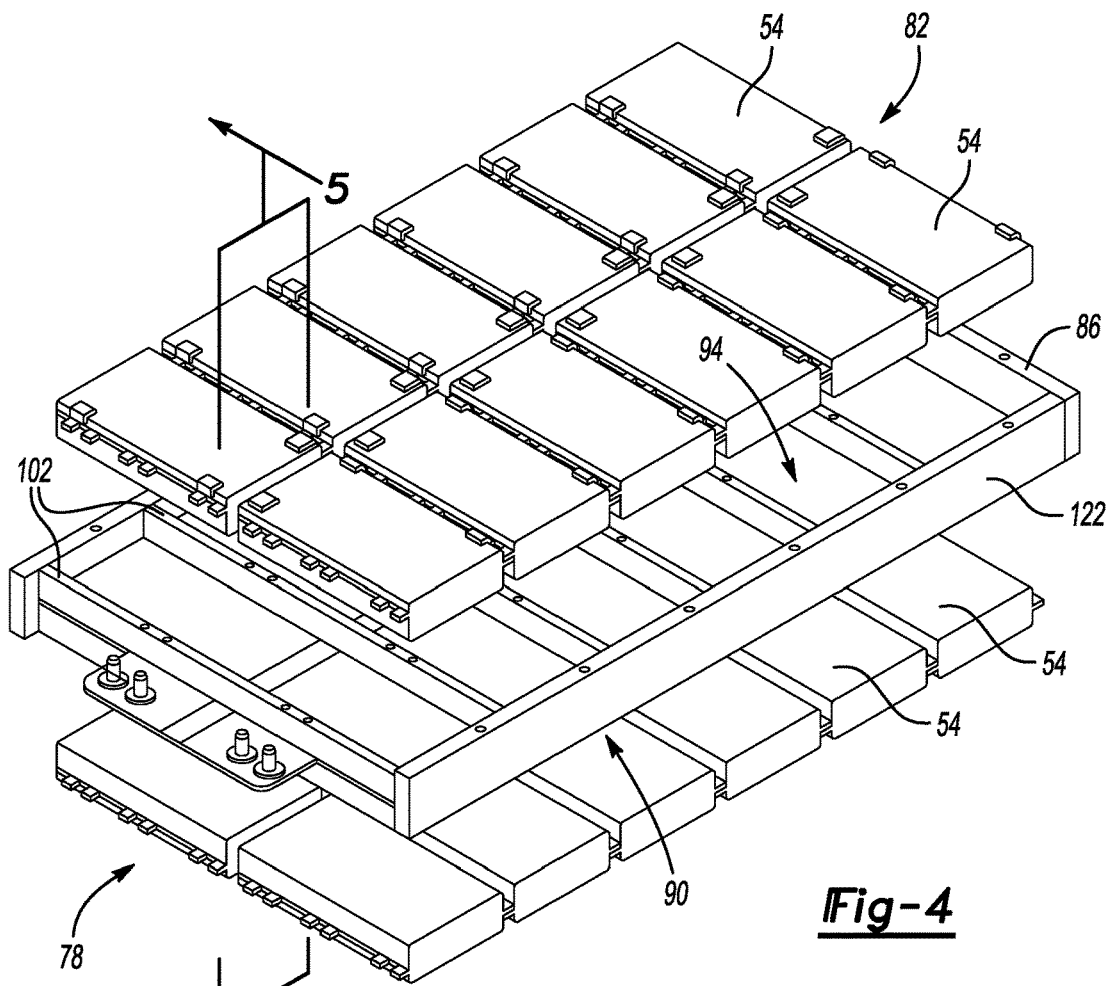
FIG. 4 illustrates a perspective and expanded view of the battery pack of FIG. 2 without the enclosure removed.
Figure 5:
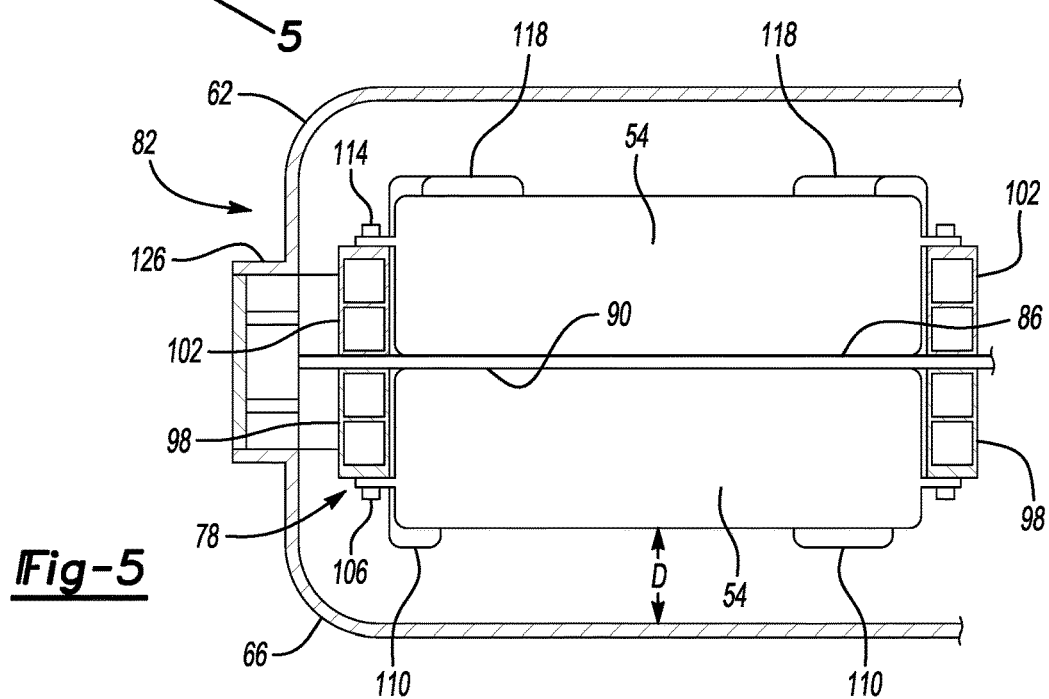
FIG. 5 illustrates a section view at line 5-5 in FIG. 4 of the battery pack when assembled.

With reference now to FIGS. 3-5 and continued reference to FIG. 2, the battery arrays 54 are arranged in more than one tier within the enclosure assembly 62. In the exemplary embodiment, the battery array 54 are disposed within a lower tier 78 or an upper tier 82. A support structure 86 is disposed between the battery arrays 54 of the lower tier 78 and the battery arrays 54 of the upper tier 82.

The support structure 86 supports both the battery arrays 54 of the lower tier 78 and the battery arrays 54 of the upper tier 82. The lower tier 78 of battery arrays 54 are secured directly to the support structure 86 such that the lower tier 78 of battery arrays 54 are suspended from a downwardly facing side 90 of the support structure 86. The upper tier 82 of battery arrays 54 are secured directly to the support structure 86 and are secured in a position where the upper tier 82 is disposed atop an upwardly facing side 94 of the support structure 86.

The support structure 86, in the exemplary embodiment, acts as a thermal exchange device, (e.g., cold plate). Coolant can circulate through channels in the support structure 86 to manage thermal energy levels within the battery arrays 54 of the lower tier 78. Although the thermal exchange device is an integrated portion of the support structure 86 in this example, other examples could include the thermal exchange device as a structure that is separate from the support structure 86.

The example support structure 86 includes include a plurality of lower tier support beams 98 and a plurality of upper tier support beams 102. The support beams 98, 102 each extend longitudinally in a cross-vehicle direction. The support beams 98, 102 can strengthen the battery pack 24 and provide anchoring locations for the battery arrays 54. The support beams 98, 102 can be extruded aluminum, for example.

The battery arrays 54 in the lower tier 78 are secured directly to the lower tier support beams 98 using mechanical fasteners 106. This securing secures the lower tier 78 directly to the support structure 86. The battery arrays 54 of the lower tier 78 hang from the support structure 86 when the battery arrays 54 are secured to the support structure 86. The battery arrays 54 of the lower tier 78 are secured such that terminals 110 of the battery arrays 54 within the lower tier 78 face downward when battery pack 24 is installed within the vehicle 74. The battery arrays 54 of the lower tier 78 are secured such that a side of the battery arrays 54 that is opposite the terminals 110 interfaces with the support structure 86, which can facilitate the support structure 86 managing thermal energy levels of the battery arrays 54 in the lower tier 78. In other examples, the terminals 110 of the battery arrays 54 within the lower tier 78 face in another direction, such as upwards.

The battery arrays 54 of the upper tier 82 are secured to the upper tier support beams 102 using mechanical fasteners 114. The battery arrays 54 of the upper tier 82 are secured such that terminals 118 of the battery arrays within the upper tier 82 face vertically upward when the battery pack 24 is installed within the vehicle 74. The battery arrays 54 of the upper tier are secured such that a side of the battery arrays 54 that is opposite the terminals 110 interfaces with the support structure 86, which can facilitate the support structure 86 managing thermal energy levels of the battery arrays 54 in the lower tier 78.

During assembly, the battery arrays 54 of the lower tier 78 can be secured the support structure 86. The lower tier 78 and the support structure 86 can then be flipped so that the upper tier 82 of battery arrays 54 can be secured to the other side of the support structure 86.

The example support structure 86 includes additional side support beams 122 disposed along opposing lateral peripherally areas of the battery pack 54. Along the outboard sides of the battery pack 24, the enclosure assembly 62 can secure directly to the side support beams 122 when the enclosure assembly 62 is enclosing the lower tier 78 and the upper tier 82 of battery arrays 54 within the enclosure assembly 62. Along a forward end of the battery pack 54, the enclosure assembly 62 can be secured directly to the forwardmost lower tier support beam 98 and the forwardmost upper tier support beam 102. Along a rearward end of the battery pack 54, the enclosure assembly 62 can be secured directly to the aftmost lower tier support beam 98 and the aftmost upper tier support beam 102.

Mechanical fasteners 126 can be used to secure the lower portion 66 and the upper portion 70 to the support beams 122. Notably, when the battery pack 24 is assembled, all portions of the lower tier 78 of battery arrays 54 are spaced a distance D from the lower portion 66 and are not directly supported by the enclosure assembly 62.

Figure 6:
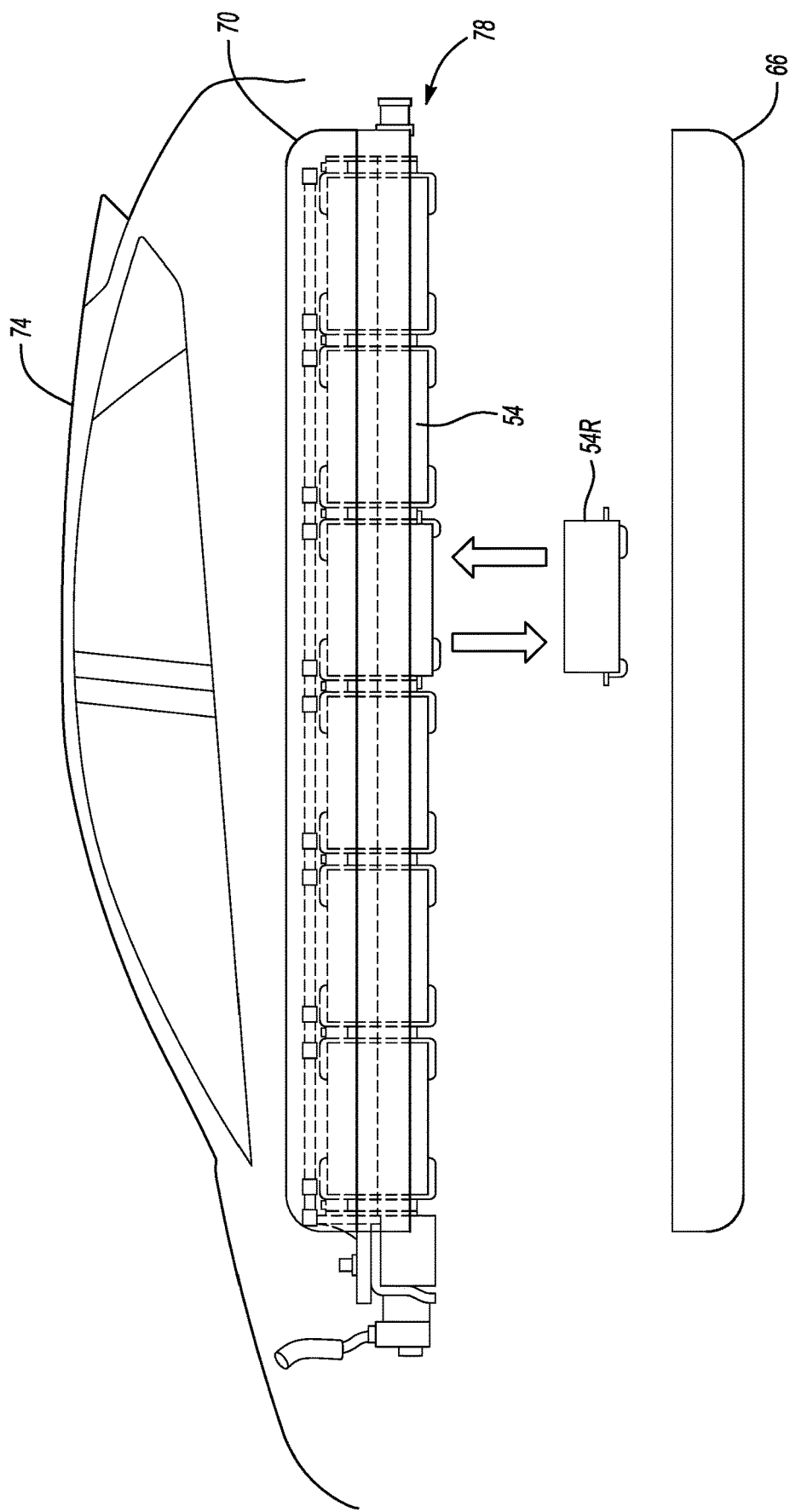
FIG. 6 illustrates a side view of the electrified vehicle of FIG. 2 when servicing the battery pack.

Referring now to FIG. 6, the design of the battery pack 24 facilitates servicing of the battery arrays 54, particularly the battery arrays 54 within the lower tier 78. If, for example, repairing or replacement the battery arrays 54R is desired, a technician can remove the lower portion 66 of the enclosure assembly 62, to access the battery array 54R. The battery array 54R can be removed from the battery pack 24 without disengaging the support structure 86, the battery arrays 54 of the upper tier 82, or other battery arrays 54 of the lower tier 78. The battery pack 24 can remain substantially attached to the vehicle 74 during servicing. This can, among other things, reduce service times and reduce costs as fewer components need to be replaced and removed during service.

In the past, battery packs having multiple tiers have included a support assembly associated with each tier.

Features of the disclosed examples include a battery pack having a sandwich type structure where a support structure is sandwiched between an upper and a lower tier of battery arrays.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
a lower tier of battery arrays, the battery arrays in the lower tier having terminals and a side that is opposite the terminals of the battery arrays in the lower tier;
an upper tier of battery arrays, the battery arrays in the upper tier having terminals and a side that is opposite the terminals of the battery arrays in the upper tier; and
a support structure disposed between the lower tier and the upper tier, the lower tier suspended from a downwardly facing side of the support structure and secured such that the side of the battery arrays in the lower tier that is opposite the terminals interfaces with the support structure, the upper tier disposed atop an upwardly facing side of the support structure and secured such that the side of the battery arrays in the upper tier that is opposite the terminals interfaces with the support structure,
wherein the side of the battery arrays in the lower tier that is opposite the terminals is opposite all the terminals in the lower tier, and the side of the battery arrays in the upper tier that is opposite the terminals is opposite all the terminals in the upper tier.

2. The traction battery assembly of claim 1, wherein the lower tier is vertically beneath both the support structure and the upper tier.

3. The traction battery assembly of claim 1, wherein the support structure is a thermal exchange plate that manages thermal energy of the battery arrays in the upper tier and the battery arrays in the lower tier.

4. The traction battery assembly of claim 1, wherein the lower tier hangs from the support structure.

5. The traction battery assembly of claim 1, wherein the lower tier is supported exclusively through the support structure.

6. The traction battery assembly of claim 1, further comprising a plurality of mechanical fasteners that secure the lower tier of battery arrays directly to the support structure and a plurality of mechanical fasteners that secure the upper tier of battery arrays directly to the support structure.

7. The traction battery assembly of claim 1, wherein terminals of the battery arrays in the lower tier face downward, and terminals of the battery arrays in the upper tier face upwards.

8. The traction battery assembly of claim 1, further comprising an enclosure assembly that encloses the lower tier and the upper tier, the lower tier spaced a distance from the enclosure assembly to provide an open area between all portions of the lower tier and the enclosure assembly.

9. The traction battery assembly of claim 8, wherein the enclosure assembly includes a lower enclosure and an upper enclosure and that are secured directly to the support structure when enclosing the upper tier and the lower tier.

10. The traction battery assembly of claim 8, wherein, when the enclosure assembly is enclosing the upper tier and the lower tier, the enclosure assembly includes a lower enclosure secured to a downward facing side of the support structure and an upper enclosure secured to an upward facing side of the support structure.

11. The traction battery assembly of claim 8, wherein the support structure is exposed outside the enclosure assembly.

12. The traction battery assembly of claim 1, wherein the support structure includes a thermal exchange plate, a plurality of upper tier support beams secured to the thermal exchange plate, and a plurality of lower tier support beams secured to the thermal exchange plate.

13. The traction battery assembly of claim 12, wherein the upper tier support beams and the lower tier support beams extend longitudinally in a cross-vehicle direction.

14. The traction battery assembly of claim 13, wherein the support structure further includes side support beams on opposing outboard sides of the support structure, the upper tier support beams and the lower tier support beams spanning between the side support beams, wherein the side support beams are sandwiched between a lower enclosure and an upper enclosure of the enclosure assembly.

15. A traction battery assembly, comprising:
a lower tier of battery arrays of a battery pack;
an upper tier of battery arrays of the battery pack; and
a support structure disposed between the lower tier and the upper tier, the lower tier of battery arrays suspended from a downwardly facing side of the support structure, the upper tier of battery arrays disposed atop an upwardly facing side of the support structure,
the support structure including a thermal exchange plate, a pair of side support beams extending along outboard sides of the battery pack, a plurality of upper tier support beams extending longitudinally in a cross-vehicle direction between the side support beams, and a plurality of lower tier support beams extending longitudinally in the cross-vehicle direction between the side support beams.

16. The traction battery assembly of claim 15, further comprising an enclosure assembly that encloses the lower tier and the upper tier, the lower tier spaced a distance from the enclosure assembly to provide an open area between all portions of the lower tier and the enclosure assembly, wherein the enclosure assembly includes a lower enclosure secured to downwardly facing sides of the side support beams and an upper enclosure secured to upwardly facing sides of the side support beams.

17. The traction battery assembly of claim 16, wherein the side support beams are exposed.

18. The traction battery assembly of claim 17, wherein the side support beams are sandwiched between the lower enclosure and the upper enclosure.

* * * * *